No. 631,069. Patented Aug. 15, 1899.
W. B. FENN.
RAISIN SEEDER.
(Application filed Feb. 7, 1898.)
(No Model.) 5 Sheets—Sheet 2.
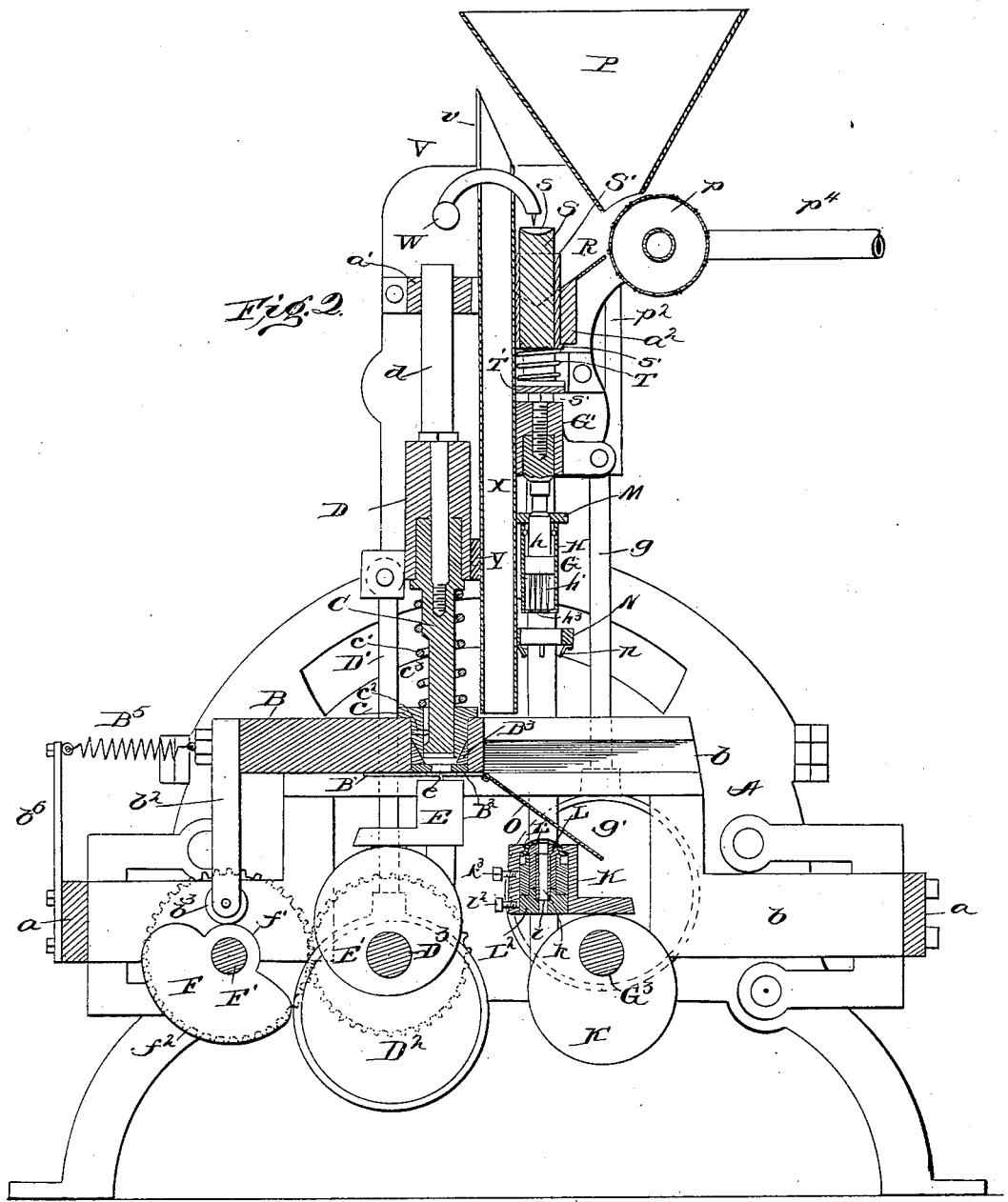

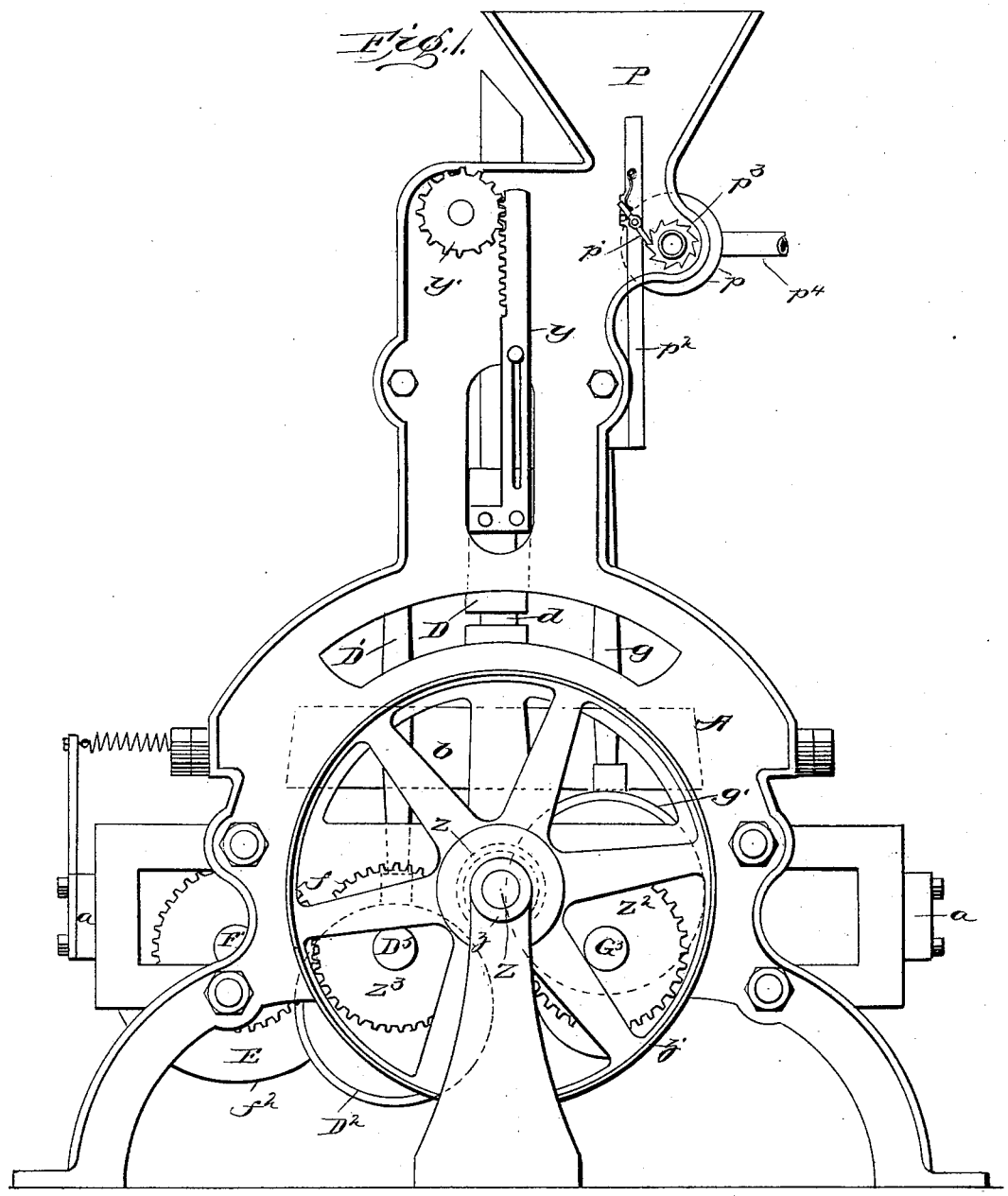

No. 631,069. Patented Aug. 15, 1899.
W. B. FENN.
RAISIN SEEDER.
(Application filed Feb. 7, 1898.)
(No Model.) 5 Sheets—Sheet 3.
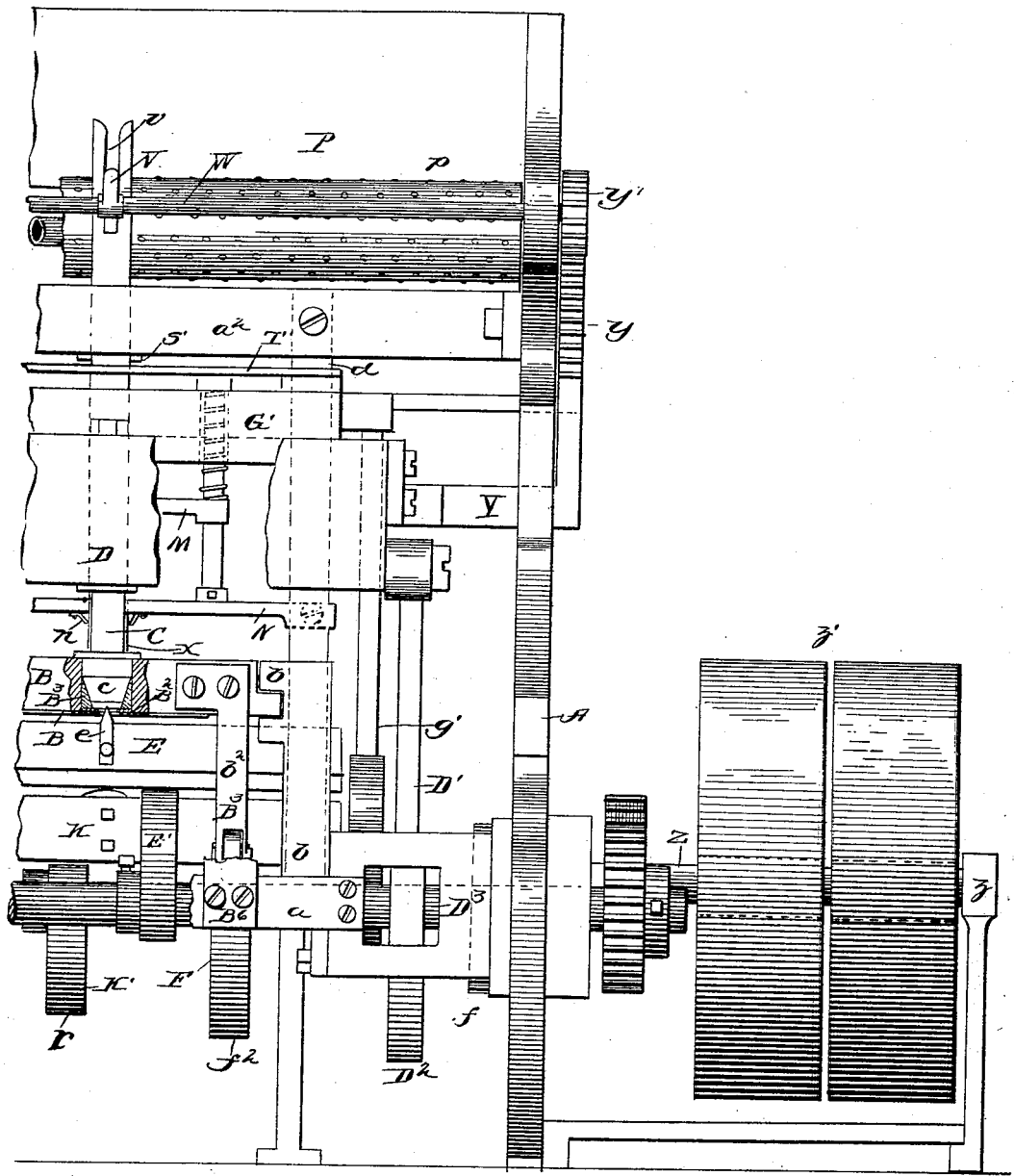

No. 631,069. Patented Aug. 15, 1899.
W. B. FENN.
RAISIN SEEDER.
(Application filed Feb. 7, 1898.)
(No Model.) 5 Sheets—Sheet 4.
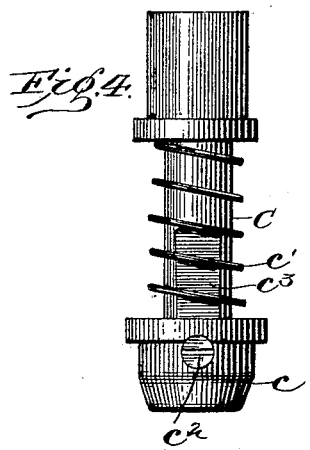
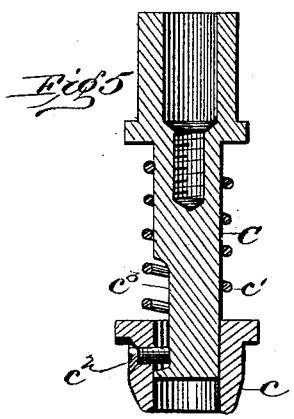
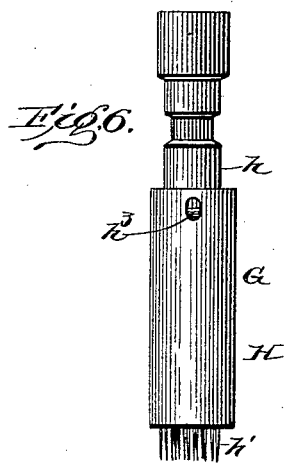
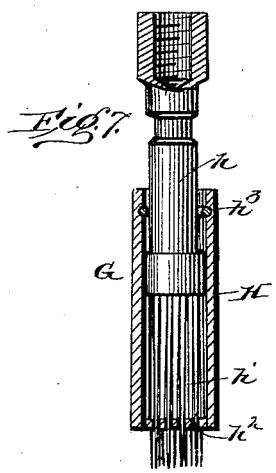
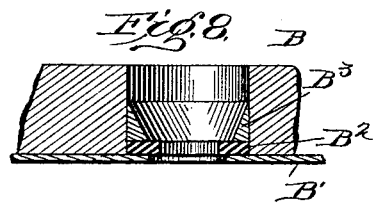
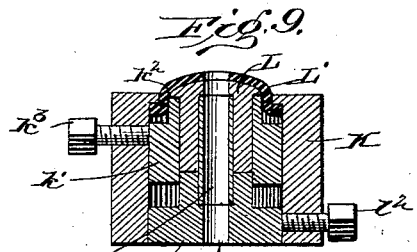

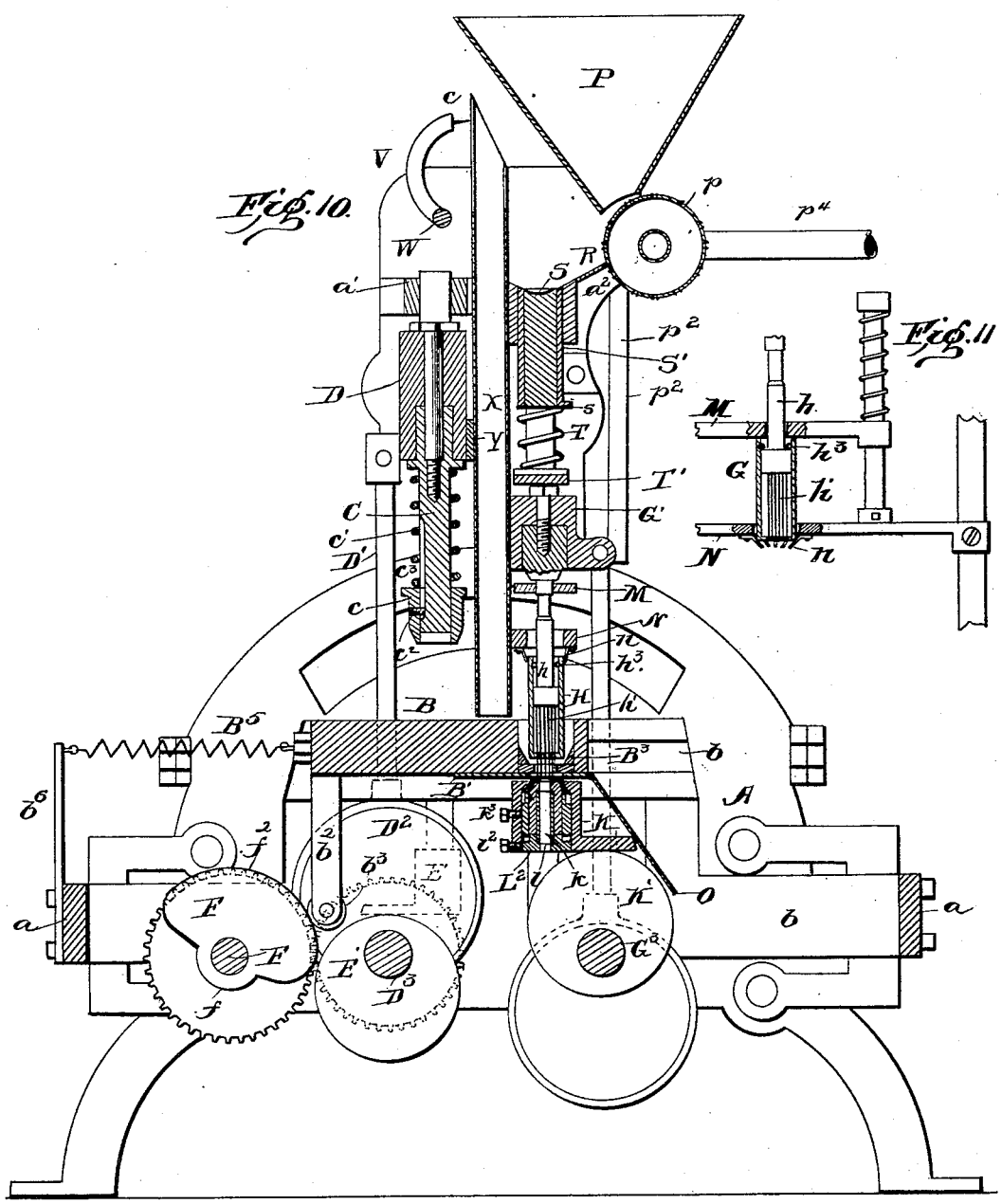

UNITED STATES PATENT OFFICE.

WILLIAM B. FENN, OF NEW YORK, N. Y.

RAISIN-SEEDER.

SPECIFICATION forming part of Letters Patent No. 631,069, dated August 15, 1899.

Application filed February 7, 1898. Serial No. 669,430. (No model.)

*To all whom it may concern:*

Be it known that I, WILLIAM B. FENN, of New York, county of New York, and State of New York, have invented certain new and useful Improvements in Raisin-Seeders; and I do hereby declare the following to be a full, clear, and exact description of the same, reference being had to the accompanying drawings, forming a part of this specification, and to the letters of reference marked thereon.

This invention relates to machines for automatically removing the pits or seed from raisins and similar small fruits, the object of the invention being to automatically present the raisins one at a time to the pit-extracting mechanism and to extract the pits therefrom speedily, effectually, and without undue mutilation of the remaining meat or skin of the fruit.

Referring to the accompanying drawings, Figure 1 is an end elevation of a machine embodying my present invention or improvements. Fig. 2 is a vertical section taken in a plane parallel to the end elevation, Fig. 1. Fig. 3 is a front elevation, partly in section and with portions broken away to disclose underlying parts of one end of the machine, one end only being shown, inasmuch as the parts represented are simply doubled for the full length of the machine. Fig. 4 is a side elevation, and Fig. 5 is a vertical section through the positioning-plunger. Fig. 6 is a side elevation, and Fig. 7 a vertical section, of the extractor or needle head. Fig. 8 is a detail section of one of the pockets in which the fruit is held and the seed expelled. Fig. 9 is a vertical section through the resilient tubular support against which the fruit is held and through which the pits or seed pass as they are expelled from the fruit. Fig. 10 is a section corresponding to Fig. 2, with the position of the parts reversed. Fig. 11 is a detail sectional elevation showing the spring-pressed bar for moving the sheaths of the extracting-heads.

Like letters of reference in the several figures indicate the same parts.

Referring to Figs. 1, 2, and 3, the frame of the machine, it will be seen, is formed by end plates A, having suitable bearings and of proper conformation to support the operative parts of the machine, such end plates being connected by horizontal bars $a\ a$ at the bottom and $a'\ a^2$ at the top.

In general terms the machine contemplates the handling of the raisins from a top hopper, into which they are dumped in bulk, being thence transferred to a secondary hopper and from this secondary hopper one by one down through suitable conduits into receptacles arranged in a transversely-moving table and in which receptacles the fruit is first positioned and centered by a suitable plunger, and, if necessary, the skin on one side lacerated, the table being then moved to bring the fruit beneath extracting-heads and above the resilient support through which the pits are expelled by the extracting-head, and finally discharging the fruit from the receptacles at a different point from the point of discharge of the pits. In accomplishing these results the transversely-moving table, which is lettered B, is preferably mounted in end guides or ways $b$, supported from the bars $a$ by brackets $b'$. Arranged in this table B are a series of pockets or receptacles for the fruit, shown in detail in Fig. 8 and formed, as will be noted from this figure, by boring straight through the table B, the aperture thereby formed being partially closed at the bottom by a perforated plate B' and a resilient annulus $B^2$, located in the bottom of the pocket and held in place by an internally tapered or conical washer or annulus $B^3$, which is driven into or expanded in the pocket above the resilient annulus $B^2$. As many of these pockets as desired may be arranged lengthwise of the table; but for convenience I have illustrated but one end of the machine in Fig. 3, showing a single pocket. The table B is adapted to be reciprocated back and forth from front to the rear of the machine and at each extreme of its movement to rest for a greater or less length of time in order, first, that the seating and centering mechanism may have time to operate when the table is at the forward end of its movement, and, secondly, in order that the extracting mechanism may operate when it is at the rearward end of its movement. The centering and seating mechanism consists, primarily, of plungers C, mounted upon or depending from a transverse vertically-movable bar or head D, which slides upon vertical shafts or rods $d$ and receives its vertical reciprocation through a connecting-rod D', extending down and operated by a strap and eccentric D² upon a shaft D³, adapted to be rotated, as will be presently explained. The mechanism is timed to cause the descent of the plungers C at the moment when the table B is at its forward rest, and surrounding the plungers C are the conical supplemental plungers c, adapted to be held in their forward position by springs c' and retained upon the plungers C by set-keys c², working in slots or ways c³ in the side of the plungers. The specific construction of each of these plungers will be seen by reference to Figs. 4 and 5, where the same is represented on a somewhat larger scale than in the other figures.

The descent of the plungers into the pockets will compress and center any fruit which may have been deposited therein and cause any pits or seeds contained in the fruit to slide into the central perforation in the bottom of the pocket, and at this point I preferably provide a means for cutting or lacerating the skin of the fruit on the under side to facilitate the expulsion of the pits, with which object in view I mount a second transverse vertically-movable head E upon the lower ends of the rods or guides d and also mount upon the shaft D³ a second set of cams E', which, coöperating with the under side of the heads E, will elevate the same at the moment when the head D is in its lowermost position. The head E carries on its upper side a series of knives or slitters e, which pass up into the pockets or into the apertures in the bottom of the pockets and perforate or lacerate the skin of the fruit contained in the pocket. The top and bottom heads are then moved out of operation by the continued rotation of the shaft D³, and when they have moved out of the path of the table B said table is advanced to the rearward extreme of its movement, this movement being imparted to it by a cam F, mounted on a shaft F', driven by gear-wheels f from the shaft D³ and adapted to operate upon the table through an arm b², carrying an antifriction-roller b³. The operative surface of the cam, it will be observed, is divided into an inner concentric portion f' and an outer concentric portion f², these concentric portions of the cam being so located as to give the desired rests to the table at each extreme of its movement, and in the preferred construction the table is drawn forward by a spring or springs B⁵, attached at one end to the table and at the opposite end to a support B⁶, extending up from one of the transverse bars a.

As before stated, when at the rear extreme of its movement the table is in position for the pockets to lie beneath suitable extracting-heads, which heads (lettered G in the accompanying drawings) are mounted upon a transverse vertically-movable head G', carried by end guides G² and adapted to be vertically reciprocated through the medium of a connecting-rod g and a strap and eccentric g', mounted upon a shaft G³ and rotated by mechanism to be presently described.

In the construction shown each of the extracting-heads is formed by an external sheath or casing H, Figs. 6 and 7, and an internal plunger h, carrying a series of extracting-needles h' in its lower end adapted to project through apertures h² in the lower end of the sheath or casing H. The entire separation of the plunger and casing is prevented by a circular key h³, surrounding a reduced portion of the plunger, and the parts are made to work with sufficient friction to hold the sheath or casing at any position to which it may be moved until a positive pressure is brought to bear upon it to again change its position of adjustment. The pockets being in position, the head G' descends and the extracting-heads G enter the pockets. The casing H, coming is contact with the fruit, is arrested and the needles enter the fruit or compress the same in such manner as to cause the pits to be expelled from the under side thereof through the aperture in the resilient washer B². In order now to insure a more perfect operation at this critical point in the handling of the fruit, and especially raisins, where the meat, skin, and pits are held together by such a viscous fluid, I provide an especially-constructed support for the meat of the fruit, with means whereby the pits may be effectually cleaned or separated from such meat and the meat saved in the body of the fruit. Supporting-heads (shown in detail in Fig. 9) are provided upon a transverse vertically-movable bar or main head K, carried by the guides G² and adapted to be moved vertically by cams K' on the shaft G³ and operating on the under side of the said head K, the cams K' and g' being arranged oppositely or so as to cause the simultaneous approach and recession of the heads K and G'.

The supporting-heads proper consist, primarily, of a centrally-perforated elastic cushion, the perforation being preferably of such size as to admit the pits only when pressure is brought to bear upon them, the walls of the aperture thus acting as stripping-surfaces for removing any adherent meat from the pits. Referring particularly to Fig. 9, it will be seen that the head K has a vertical aperture k formed therein, in which slides a sleeve k', having a reduced upper end k² and containing within it a soft-rubber plug L, preferably formed of a very soft rubber composition and centrally perforated for the passage of the pits. To provide a lasting wearing-surface, I cover this soft-rubber plug L with a resilient but tough rubber sheet or disk L', held in place by the sleeve k', the said sleeve k' being in turn held by a set-screw k³. The rubber or resilient support thus formed may, if desired, have the lower portion of its central aperture protected by a metal tube l embedded therein, and the tension or normal resiliency of the support may be adjusted by a second collar L², adapted to be adjusted vertically against the bottom of the plug L and held in its adjusted position by a set-screw $l^2$, as shown.

To remove the seeded or pitted fruit from the pockets, the extracting-heads are elevated, carrying such fruit impaled upon the ends of the needles, and, bearing in mind the fact that the sheaths on said head are movable with relation to the needles, when the heads have been elevated to a proper height and the table moved forward from beneath the heads the upper ends of the sheaths or casings strike a horizontal spring-depressed blade M, Figs. 2 and 3, causing them to remain stationary while the needles are withdrawn; and should the fruit adhere to the bottom surface of the sheaths or casings I provide a series of stripper-fingers $n$, mounted upon the horizontal bar N, fixed to the vertical guides G², which will cause any fruit adherent to the bottom faces of the sheaths after the needles are withdrawn to drop. The table having moved forward the fruit will drop upon an incline O, which may be arranged to convey it to any desired point.

For the purpose of feeding the fruit to the pockets singly the fruit is first dumped into a hopper P at the top of the machine, being adapted to be discharged from said hopper by a rotary and preferably heated feed-roller $p$ into a secondary hopper R, a portion of which may be formed by the bar $a^2$ and as shown in full and dotted lines in Fig. 2. The feed-roller $p$ may be given an intermittent rotation by a pawl $p'$, carried by a standard $p^2$, mounted on a head G', whereby when the pawl is moved downwardly it will engage one tooth of a small ratchet-wheel $p^3$ on the end of the feed-roller and impart a slight rotation thereto, the pawl then moving out of engagement with the wheel until its next downward movement. The roll $p$ may be heated through a steam-pipe $p^4$.

Working vertically through the bottom of the secondary hopper R are a series of elevators corresponding in number to the series of pockets and extracting-heads beneath, and these elevators are each preferably formed in telescoping sections, which by successive extensions tend to insure the elevation of but a single raisin at a time, and when this single raisin has been elevated mechanism is provided for conveying it down to the pockets. Referring particularly to Fig. 2, it will be seen that the elevator illustrated therein is formed by an inner section S, having a concave $s$ in its upper end and an outer section or cylinder S' inclosing the inner section S. The outer section S' is provided at its lower end with a flange $s'$, adapted to contact with the under side of the hopper R to prevent its further upward movement, and it is supported upon a spring T, the lower end of which rests upon a flange $s'$ of the inner section S. This inner section in turn rests upon a horizontal bar T', carried by the head G', although the head and bar may move out of contact with the elevator when the upper end of the elevator has descended to the bottom of the hopper R. The result of this arrangement is that when the head G' moves upwardly and contacts with the bottom of the inner section S of the elevator both sections of the elevator will be raised until their upper ends project above the bottom of the hopper R, or until the flange $s'$ arrests the movement of the outer section, when the inner section alone will be projected, and should more than a single fruit have been elevated by both sections practically all but one are sure to drop off at a point above the body of fruit in the bottom of the hopper when the inner section alone moves upwardly. The fruit having been raised on the top of the elevator, transfer-arms V, mounted on an oscillating shaft W, receive it, preferably by having it impaled upon their sharpened ends, and as the shaft W oscillates the arms V will be turned forwardly with relation to the machine and the fruit impaled upon the ends of the arms will be carried over the upper ends of chutes or tubes X, and inasmuch as the arms V work through narrow slots $v$ at the upper ends of these chutes or tubes the fruit will be scraped off into the upper ends of the tubes and descend thence by gravity to the upper surface of the table B. The movement of the parts is so timed that the fruit shall be scraped from the fingers when the table is at the rearward extreme of its movement, or at least when the pockets are to the rear of the lower ends of the tubes or chutes X. The fruit falling upon the plain upper surface of the table B will be scraped along over said surface until the pockets arrive beneath the lower ends of the chutes or tubes, when it will fall into said pockets in position to be operated upon, as heretofore described.

For the purpose of oscillating the shaft W the head D is provided with a bracket Y, extending out to the end of the machine and carrying the vertically-arranged rack-bar $y$, engaging a gear wheel or pinion $y'$ on the end of the shaft W. Thus as the head D reciprocates vertically the shaft W will be given a corresponding oscillation, and the extent of such oscillation may be readily regulated by the size of the gear-wheel $y'$ employed.

The shafts F', D³, and G³ may be rotated from any suitable source of power; but in the machine shown I provide a drive-shaft Z, mounted in suitable bearings $z$, and carrying suitable fast and loose pulleys $z'$. The shaft Z is provided with a small gear wheel or pinion Z', (shown in dotted lines, Fig. 1,) adapted to mesh with a gear-wheel Z² on the shaft G³, said gear-wheel Z' being also adapted to mesh with a gear-wheel Z³ on the shaft D³. All of these gear-wheels and the pulleys are mounted preferably outside of the main frame of the machine, the shafts D³ and G³ being extended through the frame for the purpose of receiving the gear-wheels Z² and Z³. The movement of the shaft D³ is communicated

Having thus described my invention, what I claim as new, and desire to secure by Letters Patent, is—

1. In a fruit-pitter, the combination with a pitting mechanism for removing the pits from the fruit, of a hopper for the unpitted fruit, an elevator working through the bottom of the hopper and consisting of telescoping sections, the upper ends of which rise and extend one beyond the other in the open central part of the hopper without obstruction whereby fruit dropped therefrom will fall back into the hopper in position to be again elevated, and means independent of the elevator for removing the fruit elevated by the inner section of the elevator; substantially as described.

2. In a fruit-pitter the combination with the pit-extracting mechanism of a main hopper, a feed-roll for feeding the fruit in quantity from said hopper, a secondary hopper into which the fruit is fed and selecting mechanism for transferring the fruit singly from the secondary hopper to the extracting mechanism; substantially as described.

3. In a fruit-pitter the combination with the pit-extracting mechanism, of a main hopper, a feed-roll for discharging the fruit from the main hopper, a secondary hopper for receiving the fruit from said roll, a selecting device consisting of an elevator working through the bottom of said secondary hopper and means for discharging the fruit from said elevator to the pitting mechanism; substantially as described.

4. In a fruit-pitter the combination with the pit-extracting mechanism and hopper, of an elevator working through the bottom of and extending up into the open central part of said hopper comprising a central section and inclosing telescoping section, an elevating mechanism for extending said sections successively whereby a portion of the fruit is dropped off and means for discharging the remaining fruit from said elevator to the pit-extracting mechanism; substantially as described.

5. In a fruit-pitter the combination with a movable table having a pocket therein with rigid side walls for the reception of the fruit, and an extractor working in said pocket for discharging the pits from the bottom thereof, of a resilient apertured support at the bottom of said pocket; substantially as described.

6. In a pitting-machine the combination with a table having a fruit-pocket therein with rigid side walls and an extracting-head adapted to enter said pocket and discharge the pits through the bottom thereof, of a resilient apertured support adapted to close the bottom of said pocket and form an abutment against which the meat of the fruit is arrested; substantially as described.

7. In a fruit-pitter the combination with the pocketed table having the aperture at the bottom and the pit-extracting head working into said pocket, of the resilient support movable independently of said table having a central aperture and adapted to support the fruit while the pits are extracted therefrom; substantially as described.

8. In a fruit-pitter the combination with a pit-extracting head, of a support for the fruit while the pits are being extracted therefrom formed of resilient material having an aperture in the resilient non-metallic portion thereof for the passage of the pits and a tubular metallic lining for the lower portion of said aperture, the upper end of said lining being within the resilient material whereby the resiliency of the entrance is not impaired; substantially as described.

9. In a fruit-pitter the combination with a reciprocating table having a fruit-pocket therein, a reciprocating extracting-head adapted to work into said pocket and mechanism for reciprocating said head and table, of a resilient support beneath said head and over which the pocket is brought adapted to support the fruit while the pits are being extracted therefrom; substantially as described.

10. In a fruit-pitter the combination with a reciprocating table having a fruit-pocket therein and a reciprocating extracting-head adapted to work into said pocket for discharging the pits from the fruit, of a movable resilient support independent of the table adapted to support the fruit while the pits are being extracted and having a central aperture for the passage of the pits; substantially as described.

11. In a fruit-pitter the combination with the vertically-reciprocating centering and positioning plunger and the vertically-reciprocating extracting-head, of a horizontal reciprocating table having a pocket therein with means for reciprocating said table and permitting it to rest beneath each of said heads successively and a resilient closure for the bottom of said pocket having an aperture for the discharge of the pits; substantially as described.

12. In a fruit-pitter the combination with the vertically-reciprocating positioning-head and extracting-head, of a horizontally-reciprocating pocket-table and a cam for reciprocating said table having concentric portions for permitting the table to rest at each extreme of its movement; substantially as described.

13. In a fruit-pitter the combination with a reciprocating table having a fruit-pocket, a centering and positioning head working into said pocket, a lacerator working through the bottom of said pocket, cams for moving said centering and positioning head and lacerator toward each other and a cam for intermittingly reciprocating the table, of a reciprocating extractor-head and oppositely-moving reciprocating resilient support having a central aperture through which the pits are discharged, said extractor-head and support being adapted to engage the fruit contained in the pocket and cams for simultaneously moving said extractor-head and support in opposite directions; substantially as described.

14. In a fruit-pitter the combination with the pocketed table, the centering and positioning plunger having a spring-pressed head and the cams for reciprocating said table and centering and positioning head, of the reciprocating extracting-head and the oppositely-reciprocating resilient support, with cams for moving said head and support in opposite directions for engaging the fruit between them; substantially as described.

15. In a fruit-pitter the combination with the support or table having the fruit-pocket therein, of the reciprocating extracting-head having the series of pointed extractors, an inclosing sheath or case therefor movable independently of said extractors and a stop for arresting said sheath or case and discharging the fruit from the extractors; substantially as described.

16. In a fruit-pitter the combination with the support or table having the fruit-pocket therein, of the reciprocating extracting-head having the series of pointed extractors and inclosing sheath or case therefor movable independently of said extractors and a spring-pressed stop for arresting said sheath or case and discharging the fruit from the extractors; substantially as described.

17. In a fruit-pitter the combination with the fruit receptacle or pocket of an extracting-head having a series of pointed extractors, a movable sheath inclosing said head and adapted to remain in its adjusted position on said head until moved by a positive pressure and a stop for moving said sheath to discharge the fruit from the extractors, whereby when the head enters the pocket, the fruit arrests the sheath and the extractors are projected and whereby when the sheath strikes the stop the extractors are withdrawn; substantially as described.

WILLIAM B. FENN.

Witnesses:
F. W. MERRITT,
JOSEPH ARBES.